Aug. 6, 1968
W. M. KELLY ETAL
3,395,758
LATERAL FLOW DUCT AND FLOW CONTROL DEVICE FOR WELLS
Filed May 27, 1964
6 Sheets-Sheet 1
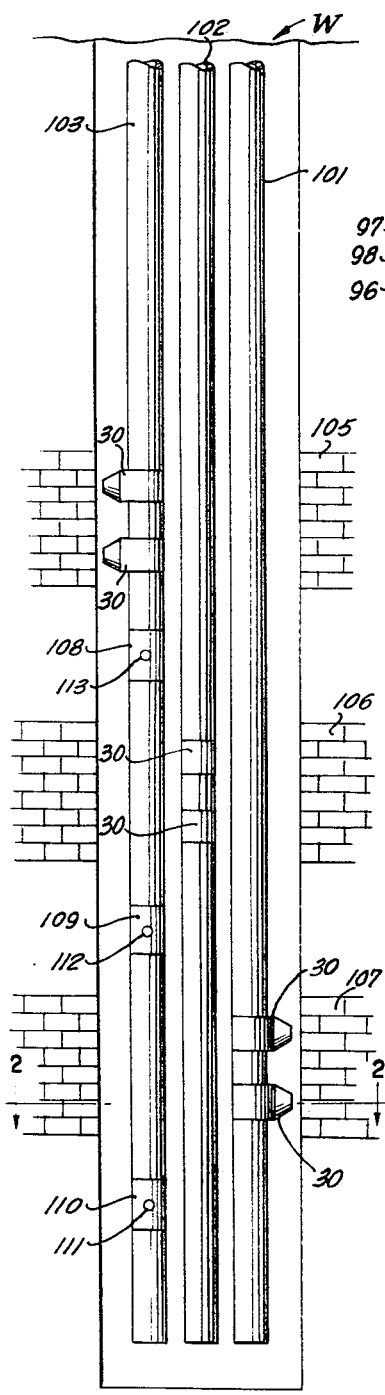
Fig. 1
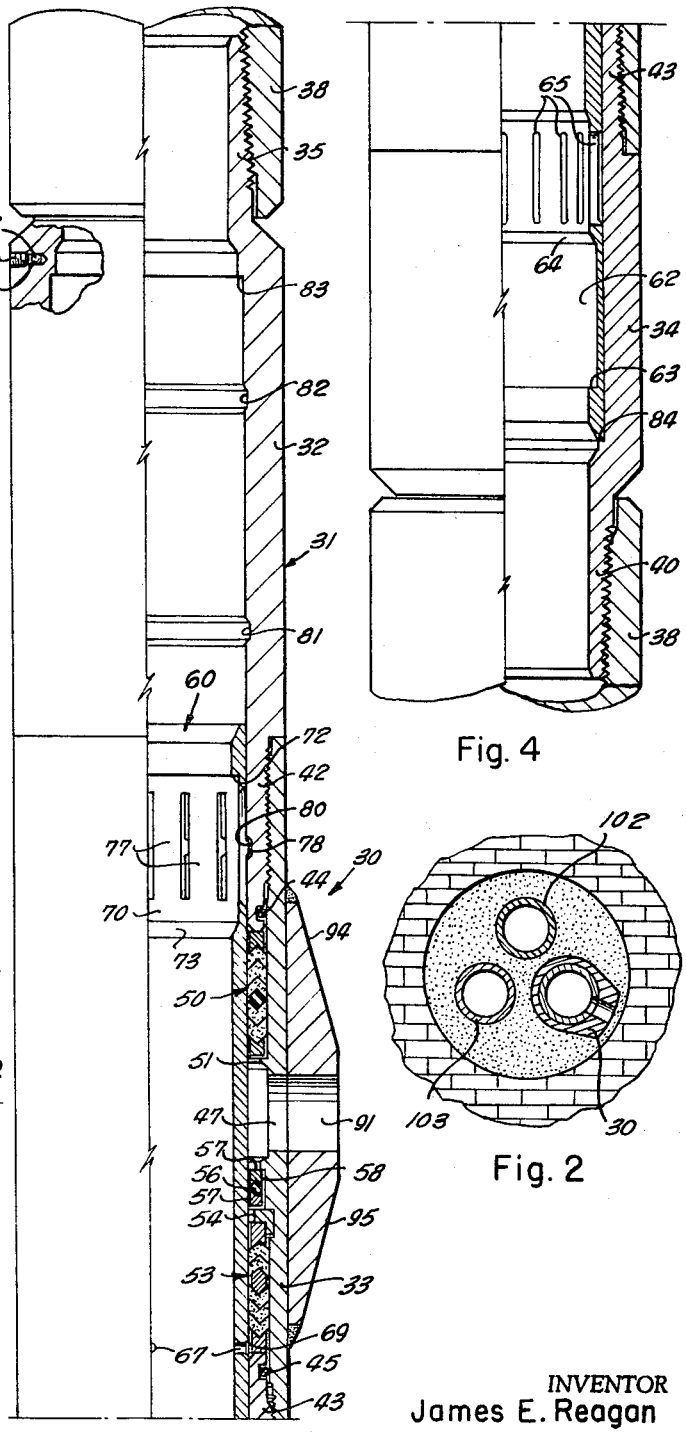
Fig. 3
Fig. 4
Fig. 2
INVENTOR
James E. Reagan
Warner M. Kelly
BY *Hastings Ackley and Walter J. Jagmin*
ATTORNEYS

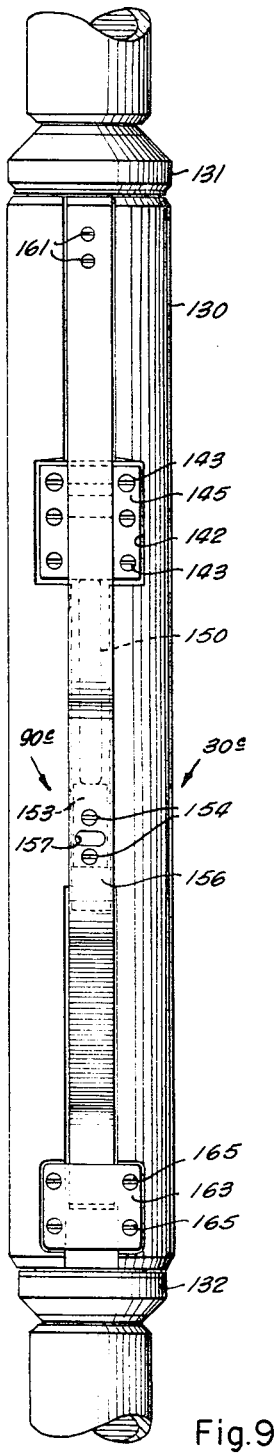
Fig. 9
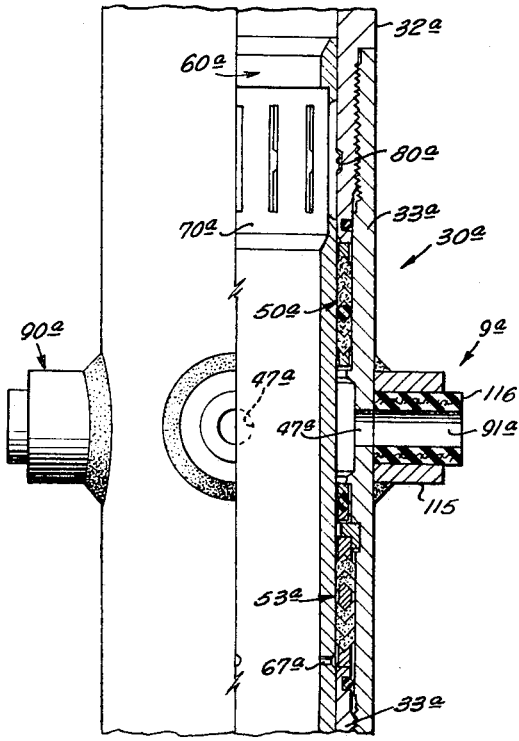
Fig. 5
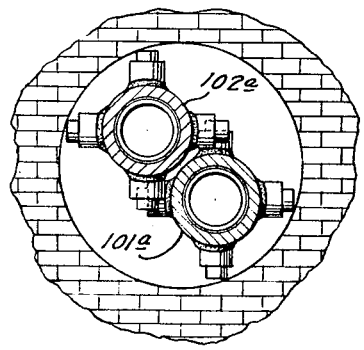
Fig. 5-A
INVENTOR
James E. Reagan
Warner M. Kelly
BY
ATTORNEYS

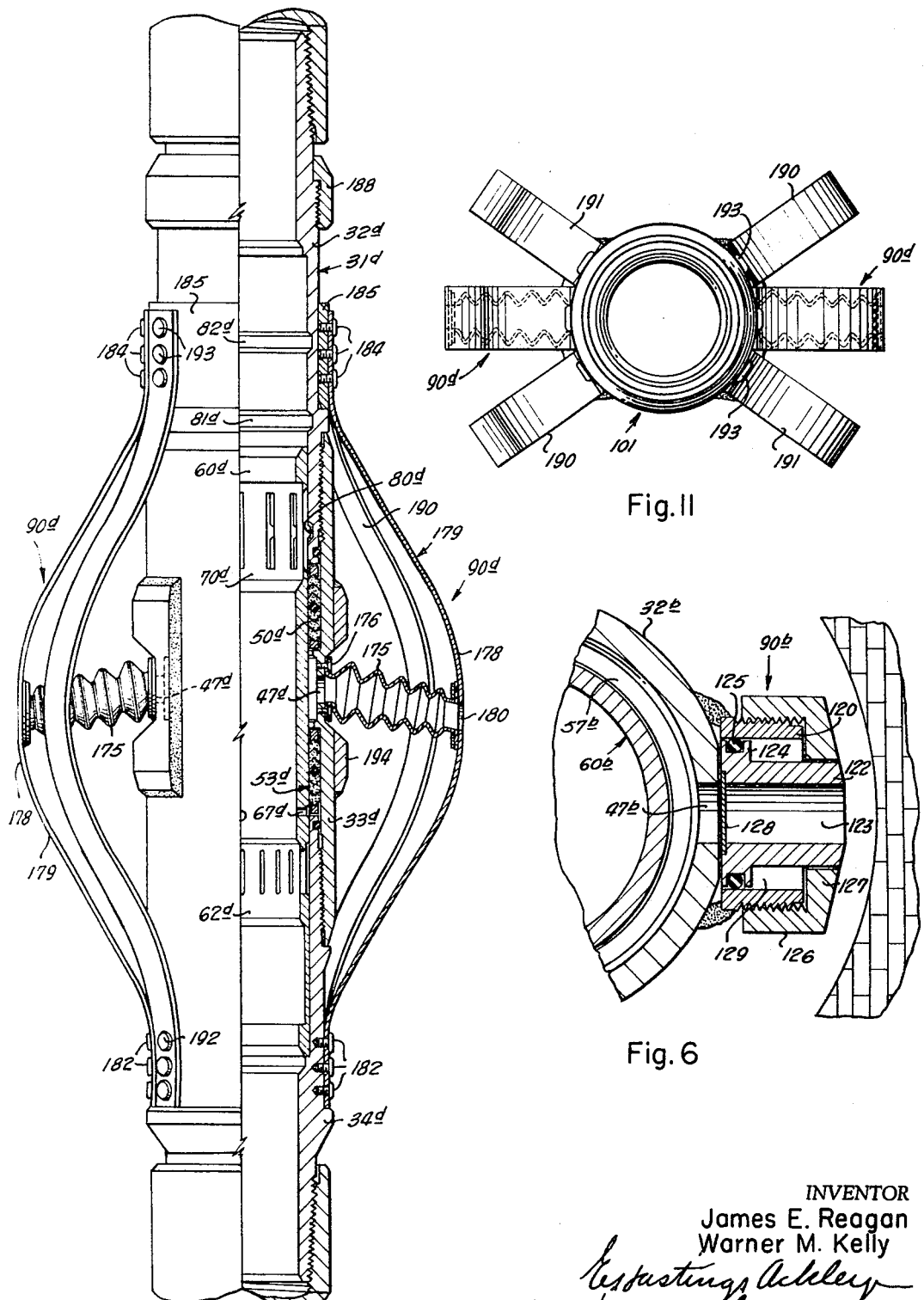

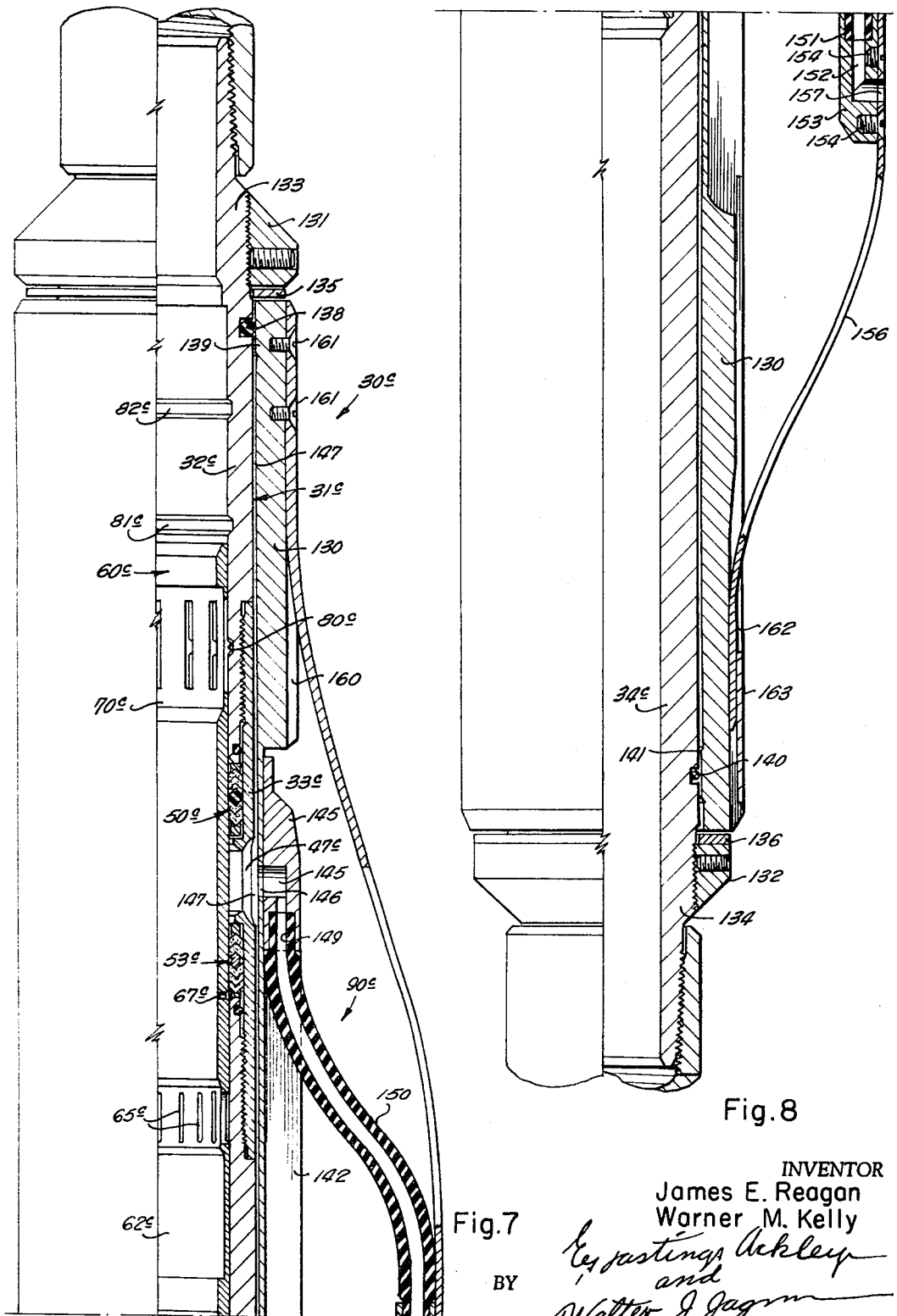

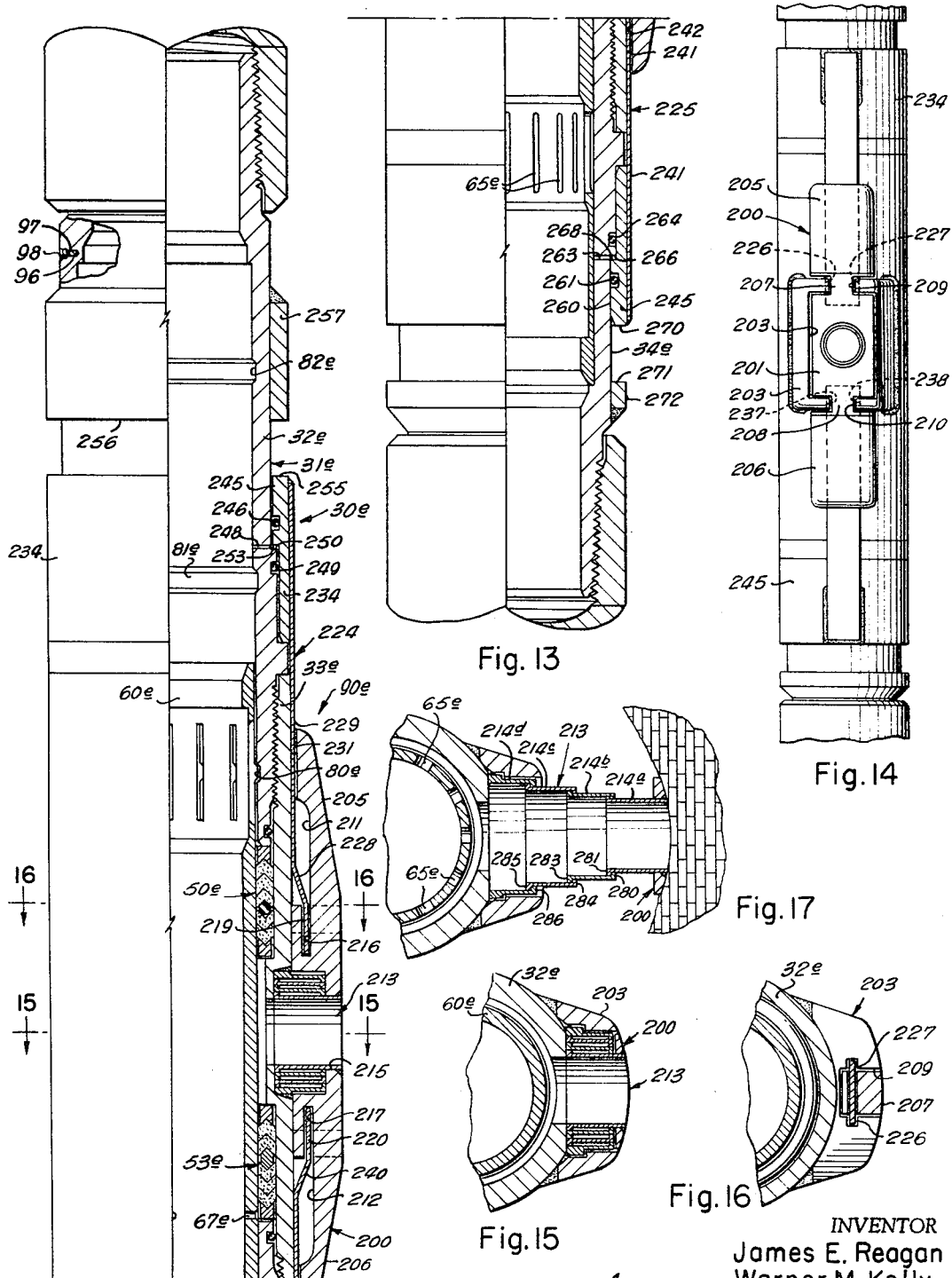

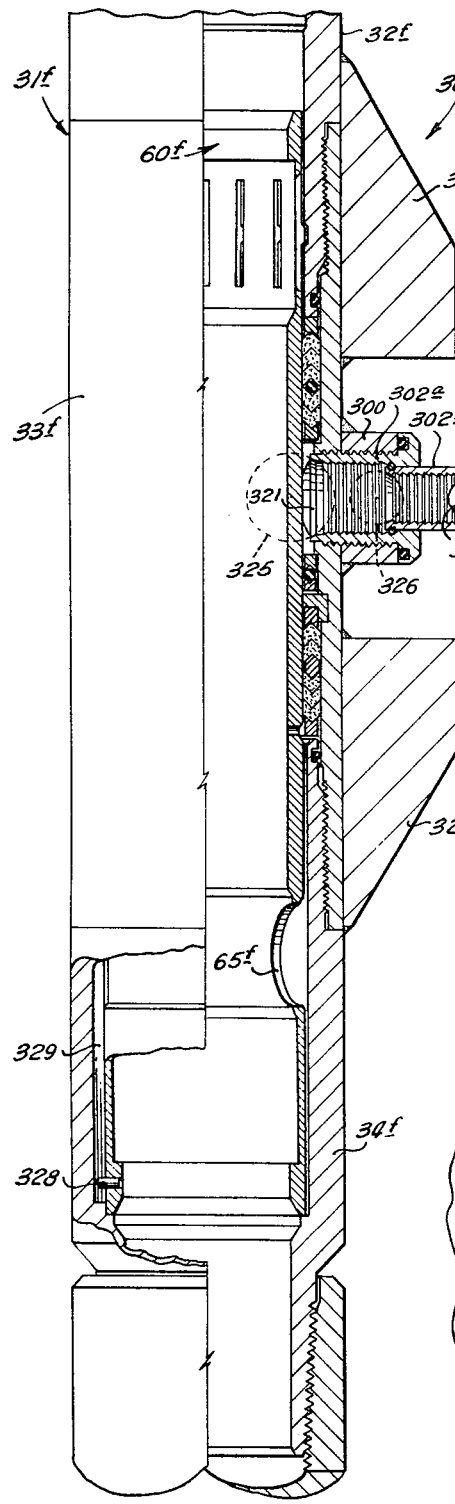
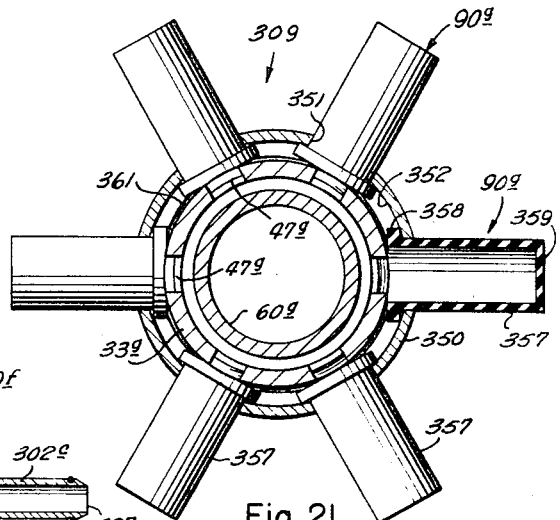
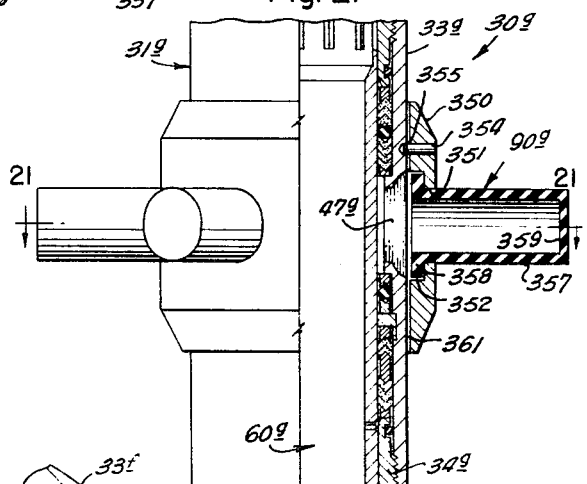
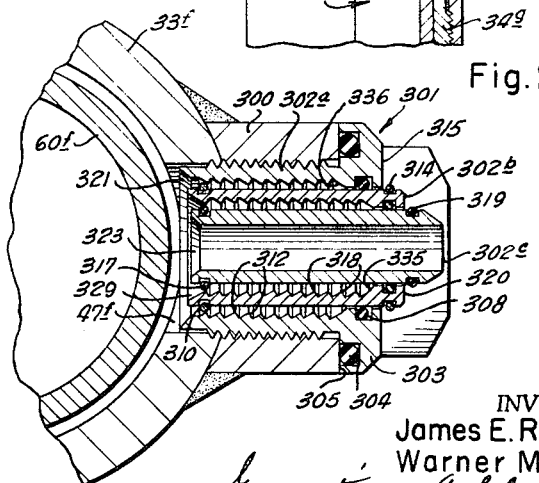
Fig. 18
Fig. 21
Fig. 20
Fig. 19
INVENTOR
James E. Reagan
Warner M. Kelly
BY
ATTORNEYS

# United States Patent Office 3,395,758
Patented Aug. 6, 1968

3,395,758
LATERAL FLOW DUCT AND FLOW CONTROL DEVICE FOR WELLS
Warner M. Kelly, Houston, and James E. Reagan, Dallas, Tex., assignors to Otis Engineering Corporation, Dallas, Tex., a corporation of Delaware
Filed May 27, 1964, Ser. No. 370,625
10 Claims. (Cl. 166—100)

This invention relates to well tools and more particularly to flow control devices which are connectable in a well flow conductor and to a method for installing in a well flow conductor provided with the flow control devices.

An object of this invention is to provide a new and improved flow control device connectable in a flow conductor, such as a string of tubing, the flow control device having port or duct means extending outwardly of the flow conductor toward a producing earth formation and providing a lateral port or passage openable, after the string of tubing has been cemented in place in the well, by fluid pressure which disintegrates any thin layer of cement between the outer end of the duct means and earth formation to permit fluid flow through the lateral passage between the earth formation and the longitudinal bore or passage of the flow conductor thus obviating the necessity of firing bullets or shaped charges through the cement to the formation, such perforating methods sometimes causing cracks in the cement which permit flow of fluids between different producing earth formations of the well.

Another object is to provide a flow control device having valve means for opening and closing the lateral passage whereby fluid flow between the longitudinal passage of the flow conductor and the earth formation may be controlled to permit various well operations to be performed, the valve means also preventing any accidental opening of the lateral passage during installation of the tubing string in a well.

Still another object is to provide a flow control device of the type described having means, such as a quantity of radioactive substance, for indicating the direction in which the duct means extends laterally outwardly from the flow conductor.

A further object is to provide a flow control device having an elongate tubular nipple connectable at its opposite ends to a flow conductor to a constitute section thereof, duct means providing a lateral passage secured to the nipple and extending radially outwardly therefrom for communicating the exterior of the nipple with its longitudinal bore or passage, and a valve mounted on the nipple for closing the lateral passage.

A still further object is to provide a flow control device of the type described wherein the duct means are movable radially toward or into engagement with a producing earth formation before the nipple is cemented in the well.

Another object is to provide a flow control device wherein the duct means which extend radially outwardly of the nipple are resilient to permit them to deflect or deform as they pass internal obstructions in the well during the movement of the tubing string in a well.

Still another object is to provide a new and improved method of installing in a well a plurality of parallel flow conductors or strings of tubing provided with the flow control devices in predetermined relationship to one another in which the duct means of the flow control devices of different strings of tubing extend laterally toward the earth formation in different directions to preclude interference or obstruction of the duct means by the strings of tubing.

Additional objects and advantages of the invention will be readily apparent from the reading of the following description of a device constructed in accordance with the invention, and reference to the accompanying drawings thereof, wherein:

FIGURE 1 as a schematic, vertical, partly sectional view of a plurality of flow conductors provided with the flow control devices embodying the invention disposed in a well having a plurality of vertically spaced producing formations;

FIGURE 2 is a vertical, sectional view taken on line 2—2 of FIGURE 1;

FIGURE 3 is a vertical, partly sectional view, with some parts broken away, of the upper portion of a flow control device embodying the invention;

FIGURE 4 is a vertical, partly sectional view, showing the lower portions of the flow control device of FIGURE 3;

FIGURE 5 is a fragmentary vertical, partly sectional view of a modified form of the flow control device illustrated in FIGURES 3 and 4;

FIGURE 5A is a view similar to FIGURE 2 showing two strings of tubing having the device of FIGURE 5 incorporated therein disposed in a well bore;

FIGURE 6 is a fragmentary, partly sectional view of another modified form of the flow control device illustrated in FIGURES 3 and 4;

FIGURE 7 is a vertical partly sectional view of the upper portions of another form of the flow control device embodying the invention;

FIGURE 8 is a view similar to FIGURE 7 being a continuation thereof and showing the lower portions of well tool;

FIGURE 9 is a reduced vertical view of the flow control device illustrated in FIGURES 7 and 8;

FIGURE 10 is a vertical, partly sectional view of another form of the flow control device embodying the invention;

FIGURE 11 is a sectional view taken on line 11—11 of FIGURE 10;

FIGURE 12 is a vertical, partly sectional view of the upper portions of another form of the flow control device embodying the invention whose duct means includes a plurality of telescopable sections;

FIGURE 13 is a view similar to FIGURE 12, being a continuation thereof showing the lower portions of the flow control device;

FIGURE 14 is a reduced vertical view of the flow control device illustrated in FIGURES 12 and 13;

FIGURE 15 is a sectional view taken on line 15—15 of FIGURE 12;

FIGURE 16 is a sectional view taken on line 16—16 of FIGURE 12;

FIGURE 17 is a view similar to FIGURE 15 showing the telescopable sections of the duct means in their extended positions and in engagement with the earth formation;

FIGURE 18 is a vertical, partly sectional view with some parts broken away of another form of the flow conductor device embodying the invention;

FIGURE 19 is a fragmentary enlarged cross-sectional view showing telescopable sections of the duct means of the control device of FIGURE 18 in telescoped positions;

FIGURE 20 is a fragmentary, vertical, partly sectional view of another form of the flow control device embodying the invention;

FIGURE 21 is a sectional view taken on line 21—21 of FIGURE 20.

Referring now to the drawings, the well tool 30 includes a nipple 31 having a top or sub section 32, an intermediate or sealing section 33 and a bottom or sub section 34. The top nipple section has a reduced externally threaded upper end portion 35 so that it may be connected to the lower end of a tubing string section (not shown) by means of a tubular coupling or collar 38. The bottom nipple section 34 is similarly provided with a lower reduced end portion 40 which is externally threaded whereby it may be connected to the upper end of a tubing string section by means of a similar tubular coupling or collar 38.

The top and bottom nipple sections have reduced lower and upper end portions 42 and 43, respectively, which are threaded in opposite ends of the intermediate nipple section. The reduced end portions 42 and 43 are provided with external recesses in which are disposed O-rings or seals 44 and 45 which seal between the subsections and the intermediate sealing sections. The sealing section is provided with a lateral port or aperture 47. An upper seal assembly 50 is carried by the intermediate nipple section above the port 47 and is held between the upper annular shoulder of an internal annular flange 51 of the intermediate nipple section and the lower end of the top nipple section 32. The seal assembly may be of the chevron type. The intermediate nipple section is provided with a similar lower seal assembly 53 which is held in place therein by a split retainer ring 54 disposed in a suitable internal recess of the intermediate nipple section and by the upper end of the bottom nipple section. The lower seal assembly may be similar to the upper seal assembly.

An O-ring seal 56 is carried by the intermediate nipple section and is disposed between a pair of female adaptors 57 so that only small annular portions of the O-ring extend outwardly of the female adaptors. The female adaptors abut the lower annular shoulder 58 of the intermediate nipple section and the upper surface of the retainer ring 54 and thus holds the assembly of the O-ring and the female adaptors in proper operative positions between the lower seal assembly 53 and the port 47. The seal assemblies 50 and 53 and the O-ring 56 are adapted to seal between the intermediate nipple section and an internal valve element or sleeve valve 60 which is longitudinally movable in the nipple 31.

The sleeve valve is provided adjacent its lower end with an internal annular key recess 62 which provides an upwardly facing abrupt stop shoulder 63 and an upwardly and inwardly extending upper cam shoulder 64. The sleeve valve has a plurality of circumferentially spaced longitudinal slots or flow ports 65 disposed above the key recess 62 which are adapted to be alignend with the lateral port of the nipple when the sleeve valve is in its uppermost position in the nipple and with a plurality of equalizing ports 67 of restricted orifice which are adapted to communicate with the lateral port 47 when the sleeve valve is in an intermediate position in the nipple. As the sleeve valve is moved upwardly in the nipple from its closed position illustrated in FIGURES 3 and 4, the equalizing ports move past the O-ring 56 to permit slow equalization of pressure between the exterior and the interior of the nipple prior to the establishment of a free flow of fluid therebetween. The sleeve valve is preferably provided with external recesses 69 which slope inwardly to the equalizing ports in order to permit pressure of the fluids from the exterior of the well flow conductor to be exerted on the O-rings 65 prior to the achievement of full communication between the equalization ports and the lateral port 47 so that the O-ring is moved slowly out of engagement with the external surface of the sleeve valve prior to the establishment of a free flow of fluid through the equalizing ports. This slow compression or inward movement of the O-ring between the female adaptors serves to protect the O-ring from injury or damage which might occur were the pressure differential thereacross be suddenly increased due to the instantaneous alignment of the port 67 with the lateral port 47. Moreover, it will be noted that only small portions of the O-rings are ever in engagement with the sleeve valve since the largest part of the O-ring is disposed between and is protected by the female adaptors.

The upper portion of the sleeve valve above the equalizing ports 67 has an upper annular key recess 70 which provides an abrupt downwardly facing shoulder 72 and an inwardly and downwardly extending cam shoulder 73. The sleeve valve at the upper key recess has a plurality of longitudinal slots 75 which provide resilient flexible collet sections 77, each having an external boss 78 provided with outwardly convergent upper and lower shoulders. The bosses 78 are receivable in the longitudinally spaced annular locating recesses 80, 81 and 82. When the sleeve valve is positioned in its lowermost position in the nipple, the bosses 78 are disposed in the bottom locating recess 80, the port 47 is closed by the sleeve valve and no flow of fluids between the interior of the nipple and the exterior thereof can take place. When the sleeve valve is in an intermediate position in the nipple, the bosses 78 are disposed in the intermediate locking recess 81 and the equalizing ports 67 are in alignment or communication with the lateral port 47 so that a restricted flow of fluids may take place between the exterior and the interior of the nipple and the pressure differential therebetween may be equalized. When the sleeve valve is in its uppermost position in the nipple, the bosses 78 are located in the upper locating recess 82, the longitudinal slots or flow ports 65 of the sleeve valve are aligned with the lateral port 47 of the nipple and substantially unrestricted flow through the port 47 may take place between the exterior and the interior of the nipple.

The outwardly convergent upper and lower shoulders of the bosses cooperate with the upper and lower shoulders of similar configuration of the locating recesses to cam the bosses and therefore the resilient collet strips 77 inwardly to permit movement of the sleeve valves between such bottom, top and uppermost positions in the nipple. The collet strips and the bosses of course releasably latch the sleeve valve in any one of these three positions. Upward movement of the sleeve valve and the nipple is limited by the engagement of its top end with the downwardy facing annular shoulder 83 of the top nipple section and its downward movement is limited by the engagement of its bottom end with the upwardly facing annular shoulder 84 of the bottom nipple section. The described nipple and sleeve valve are of the type fully disclosed in Patent No. 3,051,243 to George G. Grimmer and James Bostock which also fully describes a shifting tool lowerable through a well flow conductor which has means engageable in the recesses 62 or 70 for shifting the sleeve downwardly or upwardly between its three operative positions and such tool and the sleeve valve will not therefore be more fully described herein.

The intermediate nipple section has a longitudinally extending duct means or boss 90 rigidly secured thereto which has a port 91 which is in alignment and in communication with the lateral port 47 of the intermediate nipple section. The ports 47 and 91 provide a lateral passage whose outer end opens at a location spaced radially outwardly of the outer surface of the nipple and whose inner end opens to the interior of the nipple and is closable by the sleeve valve. The duct means or boss 90 has top and bottom shoulders 94 and 95, respectively, which slope divergently inwardly toward the external surface of the nipple and serve to facilitate the movement of the flow control device past internal obstructions in a well flow conductor.

The top nipple section is provided with a lateral bore 96 in which is receivable a pellet 97 of radioactive substance. The outer enlarged portion of the bore or pocket is threaded and receives a plug 98 which holds the radioactive pellet against displacement from the pocket.

Referring now particularly to FIGURES 1 and 2 of the drawing, three strings of tubing 101, 102 and 103 each having one or more of the flow control devices 30 connected thereto and constituting sections thereof are shown positioned in a well W prior to the cementing thereof in the well. The well bore passes through three producing earth formations 105, 106 and 107. The flow control devices 30 of the string of tubing 101 are positioned in the well to control the flow of fluids between the bottom producing formation 107 and the surface through the string of tubing 101, the flow control devices 30 connected in the string of tubing 102 and constituting sections thereof are positioned to control flow of fluids between the intermediate producing earth formation 106 and the surface through the string of tubing 102, and the flow control devices 30 of the string of tubing 103 are positioned to control the flow of fluids between the top producing earth formation 105 and the surface through the string of tubing 103.

The string of tubing 103 has also connected therein suitable flow control devices 108, 109 and 110 such as the flow control devices disclosed in Patent No. 3,051,243. The top flow control device is positioned between top and intermediate earth formations, the intermediate flow device 109 is positioned between the intermediate and bottom earth formations and the flow control device 100 is positioned below the bottom earth producing formation.

During the drilling of the well W, its bore is filled with weighted mud or drilling fluid which is left in the well when the drilling pipe is removed therefrom prior to the installation of the three strings of tubing to hold the bore open. The location of the producing earth formations is determined by any suitable logging method prior to the installation of the strings of tubing through which the well fluids from the three producing earth formations are to be produced. The string of tubing 101 is first installed in the well to a position wherein its flow control devices 30 are positioned in alignment with or adjacent the bottom producing earth formations. The second string of tubing 102 is then installed in the well with its flow control devices located adjacent or at the intermediate producing formations 106 and finally the third string 103 is lowered into the well until its flow control devices 30 are positioned in alignment or adjacent the top producing earth formations 105. The strings of tubing are run into and installed in this sequence to obviate the necessity of having to move the control devices 30 of one string of tubing past the control devices 30 of another string of tubing already installed and in the well, since the external duct means or bosses of the control devices of the already installed string of tubing might obstruct or interfere with the movement therepast of the bosses of the flow control devices of the next string of tubing.

The bottom ends of the three strings of tubing 101, 102 and 103, are open as they are run into the well and the strings of tubing are filled with the drilling mud or liquid present in the well. A radiation detector device of any usual well known type, e.g., scintillation, is then lowered through one of the strings of tubing, for example the third string of tubing 103 to a depth determined by the previously run log at which it is desired that the fluids from the bottom earth formation 107 be produced. The first string of tubing 101 is then raised or lowered until the detector device, which senses the radiation emanating from the pellets of radioactive substance carried by the control devices 30 of the first string of tubing indicates that these control devices are at desired positions at which the well fluids from the bottom producing formation are to flow into the first string of tubing. The first string of tubing is then rotated until the detector device indicates that the bosses or duct means 90 of the flow control devices of the first string of tubing extend away from the other two strings of tubing and thus toward the earth producing formation as indicated in FIGURE 2. It will be apparent that since these pellets are disposed diametrically opposite the bosses or duct means, the detector device will indicate the maximum radiation from the pellets of the control devices of the first string of tubing when their duct means are remote from and extend away from the third string of tubing. The first string of tubing may be easily moved and rotated since the cable by means of which the detector device is moved into a string of tubing and by means of which its signals are transmitted to the surface, is positioned in the third string of tubing.

The radiation detector device is then raised until it is at a depth determined by the previously run log at which it is desired that the fluids from the intermediate earth formation 106 be produced. The second string of tubing 102 is then raised or lowered until the detector device indicates that the flow control devices of the second string of tubing are at positions at which it is desired that well fluids from the intermediate earth formation flow into the second string of tubing. The second string of tubing is then rotated until the detector device indicates that the duct means of the flow control devices 30 of the second string of tubing are remote from and extend away from the third string of tubing. The radiation detector is then removed from the third string of tubing 103 and lowered in one of the other strings of tubing, for example the first string of tubing 101 and is positioned in desired alignment with the top producing formation 105. The third string of tubing is then raised or lowered until the detector device indicates in the manner previously described, that the control devices 30 of the third string of tubing are positioned in desired relation to the top earth formation. The third string of tubing is then rotated until the duct means 90 of its control devices extend away from the other two strings of tubing. The outer ends of the duct means of the control devices of the three different strings of tubing are now positioned very closely or adjacent to the internal surfaces of the well of the three different earth formations and they extend outwardly away from each other in three different directions. The lateral passages of the control devices 30 of the three strings of tubing are now of course filled with drilling mud or liquid which is present in the well bore.

The radiation detector device is then removed from the first string of tubing and a suitable shifting tool of the type described in the Patent No. 3,051,243 is then lowered in the third string of tubing and employed to open the side port 111 of the bottom flow control device 110 while all other flow control devices are kept closed. A measured volume or charge of cement slurry is then pumped down through the third string of tubing and issues from the side port 111 to fill the well bore about the three strings of tubing to a level slightly above the lower producing formation 107. The introduction of the charge of cement slurry into the well bore causes an equal volume of the drilling mud or liquid to be expelled from the bore of the well at the surface. Thereafter the shifting tool is again employed to close the side port 111 of the bottom flow control device 110 and then to open the side port 112 of the intermediate flow control device 109. A second charge of cement slurry is then pumped through the third string of tubing and issues through the open side port 112 to fill the well bore about the strings of tubing from slightly below to slightly above the intermediate earth formation 106. A similar quantity of mud or fluid is of course expelled from the well bore at the surface as the second charge of cement slurry is introduced into the well bore. The shifting tool is then employed to close the side port 112 of the intermediate flow control device 109 and to open the side port 113 of the top flow control device 113. The third charge of cement slurry is then pumped into the third string of tubing into and through the open side port 113 until it fills the well bore about the three strings of tubing from slightly below to slightly above the top earth formation 105. The well tool is then employed to close the side port 113. Since the duct means or bosses of the control devices 30 of the strings of tubing are adjacent to or perhaps contacting the internal surfaces of the producing formations, only a very thin layer of the cement slurry is introduced between the outer ends of the duct means and such surface of the producing formations.

The three charges of cement slurry are now allowed to set and harden. When the three charges of cement have hardened they seal off the three earth formations at the internal surfaces of the well. The shifting tool is employed to open the sleeve valves 60 of the control devices 30 of the three strings of tubing and then the drilling mud is swabbed from each string of tubing by any suitable well known swab tools. As the drilling mud or liquid is swabbed from each string of tubing, a pressure differential is created across the thin layer of now hardened concrete between the outer ends of the duct means 90 and the surface of the adjacent earth formation which causes this thin layer of cement at this location to disintegrate. The outer ends of the ports 91 of the duct means 90 are thus placed in communication with the producing earth formations.

It will be apparent that each string of tubing may be provided with more than two flow control devices as required by the characteristics and the thickness of the earth formations whose fluids are to be produced by the string of tubing. For example, if the producing earth formation is relatively thick and has several producing zones separated by impermeable strata, one or more of the flow control devices may be positioned in alignment with each such zone of the earth formation to cause the fluid from such zones to flow into the string of tubing. It will also be apparent that the three strings of tubing may be provided with suitable landing nipples at various positions, as at their lower end portions, in which plugs or other well tools may be positioned, to permit other usual well operations to be performed. The three strings of tubing extend to positions near the bottom of the well bore in order that various other subsequent well operations may be performed which may require that all of the strings of tubing extend below the lowest producing earth formation.

If it is subsequently desired to perform some operation on a particular producing earth formation or if a particular formation has several zones of production, the flow control devices 30 connected in the string of tubing through which the well fluids from the particular producing formation are produced may be opened and closed as required to prevent or permit flow of fluids between the string of tubing and the earth formation during such operation. For example, if it is desired to treat the bottom producing earth formation 107 with acid to stimulate its production, a shifting tool is lowered into the first string of tubing to close the upper flow control device 30 of the first string of tubing 101 and then acid pumped into the first string of tubing at the surface is introduced under pressure into the earth formation through the lower flow control device 30 of the first string of tubing. Subsequently, the shifting tool is used to open the upper flow control device 30 and close the lower flow control device 30 of the first string of tubing so that the acid is introduced into the earth formation only through the upper flow control device. It is often desirable that only one of the plurality of flow control devices 30 connected in a particular string of tubing be opened during the injection or pumping of acid into the formation in order that the acid be injected at relatively great pressure into the earth formation or, if the flow control devices 30 are used to control the flow of fluid to and from different zones of the same producing formation, to cause only a predetermined zone to be so treated.

It will now be seen that the new and improved method of installing a plurality of parallel strings of tubing, each provided with a flow control device having valve means closing a lateral passage thereof whose outer end is spaced from the string of tubing and a signal generating means, such as a pellet of radioactive substance, positioned in predetermined circumferential relationship relative to the lateral passage, has been described which includes the steps of lowering successively into the well the strings of tubing which are to produce fluids from vertically spaced earth formations, successively positioning the detector device, such as a scintillator detector, in a string of tubing at the locations of producing earth formations, moving the flow control devices of the strings of tubing through which well fluids from such earth formations are to be produced by the signals received by the detector means into positions wherein the outer ends of their lateral passages are adjacent the surfaces of the earth formations in the well bore, closing the well bore at each earth formation by introducing cement into the well bore at the locations of the producing earth formation, allowing the cement to set, and then opening the lateral passages to create a pressure differential between the earth formations and the lateral passages to disintegrate the cement between the earth formations and the outer ends of the lateral passages.

It will further be seen that the method may also include the subsequent steps of closing predetermined ones of the flow control devices of each string of tubing to permit injection of fluids into the formation at the locations of predetermined others of the flow control devices.

Referring now to FIGURES 5 and 5A of the drawing, the flow control device 30a is similar to the flow control device 30 and accordingly its elements have been provided with the same reference numerals, to which the subscript "a" has been added, as the corresponding elements of the flow control device 30. The flow control device 30a differs from the flow control device 30 in that its intermediate nipple section 33a is provided with a plurality of circumferentially spaced lateral ports 47a and a plurality of radially outwardly extending duct means 90a each of which provides a lateral passage 91a which communicates with a lateral port 47a of the intermediate nipple section. Each of the duct means 90a includes a rigid tubular section 115 rigidly secured to the intermediate nipple section and about a lateral port 47a in any suitable manner, as by welding, and a resilient tube 116 disposed within the tubular section and bonded thereto in any suitable manner. The resilient tube has an outer end portion which extends outwardly of the tubular section.

The flow control device 30a may be connected in a string of tubing for installation in a well, if only one string of tubing is employed, wherein the internal diameter of the well bore is substantially greater than the distance between the outer ends of the diametrically opposite tubular sections 115 to facilitate movement of the flow control device through the well bore. The resilient outer end portions of the resilient tubes may deform or flex upon meeting obstructions in the well bore. When the flow conductor is positioned in the well with the flow control device at a producing earth formation, the outer end of at least one of the resilient tubes will be adjacent or contacting the internal surface of the formation even if the flow control device is not properly centered in the well. A charge of cement slurry may then be introduced in any usual manner into the well bore to seal off the producing earth formation and, when the cement has set, opening of the sleeve valve 60a and the subsequent swabbing of the string of tubing will cause any thin layer of cement between any resilient tube and the earth formation to disintegrate so that the fluid flow may then take place between the string of tubing and the producing earth formation.

As illustrated in FIGURE 5A, two strings of tubing, 101a and 102a provided with the flow control devices 30a may be inserted in a single well with one string of tubing extending between a pair of the radially outwardly extending duct means 90a of the other. In this case the string of tubing 102a which is to produce from a higher earth formation has its lower end preferably spaced above the control devices 30a of the first string of tubing 101a which was first installed in the well since the duct means 90a of the flow control devices of the first string of tubing could obstruct the movement therepast of the lower end of the second string of tubing.

It will be apparent that if two strings of tubing having the flow control devices 30a are installed in a well at least one of the resilient tubes of each flow control device of each string of tubing will be contacting or be very closely adjacent its associated producing earth formation.

Referring now particularly to FIGURE 6 of the drawing, the flow control device 30b is similar to the flow control device 30 illustrated in FIGURES 3 and 4 and accordingly the elements of the control device 30b have been provided with the same reference numerals, to which the subscript "b" has been added, as the corresponding elements of the flow control device 30. The flow control device 30b dicers from the flow device 30 in that its duct means 90b includes a cylinder 120 rigidly secured to the intermediate nipple section 33b in alignment with and about the lateral port 47b of the intermediate nipple section. A movable tubular duct 122 having a passage 123 is mounted for slidable movement in the cylinder and is provided with an external annular piston flange 124 having an external annular recess in which is disposed an O-ring 125 which seals between the piston flange and the cylinder. A cap 126 threaded on the cylinder has an internal flange 127 engageable with the piston flange 124 to limit outward movement of the duct. A frangible disk 128 closes the inner end of the passage 123 and is secured to the duct in any suitable manner, as by bonding. After a string of tubing having the flow control device 33b connected thereto has been positioned in proper position relative to a producing earth formation, the sleeve valve 60b is moved to its upper open position and the pressure within the string of tubing is increased as by pumping thereinto at the surface. In this case, the lower end of the tubing is closed by any suitable plug or well tool. As the pressure within the string of tubing is increased, the force of such pressure moves the duct 122 outwardly. The fluid trapped in the annular space 129 between the cylinder and the duct flows outwardly between the duct and the stop flange 127. The duct moves outwardly until its outer end engages the earth formation. The sleeve valve 60b is then again closed and a charge of cement slurry is introduced into the well bore in the usual manner to seal off the producing earth formation, and close the well bore at its location. After the cement has set, any thin coating or layer of cement between the outer end of the duct 122 and the adjacent surface of the earth formation and the frangible disk will disintegrate as the weighted drilling fluid in the string of tubing is swabbed therefrom in the usual manner and creates a pressure differential between such earth formation and the interior of the flow control device.

Referring now particularly, to FIGURES 7, 8 and 9 of the drawing, the flow control device 30c is similar to the flow control device 30, and, accordingly, its elements have been provided with the same reference numerals to which the subscript "c" has been added, as the corresponding elements of the flow control device 30. The duct means 90c of the flow control device 30c includes a sleeve 130 disposed about the nipple 31c and held in desired longitudinal position thereon by top and bottom keeper rings 131 and 132, respectively, threaded on the intermediate portions 133 and 134 of the top and bottom nipple sections 32c and 34c, respectively. Spacer and friction reducing rings 135 and 136 are interposed between the keeper rings and the top and bottom end shoulders of the sleeve 130 to facilitate rotation of the sleeve relative to the nipple. The top nipple section has an external annular recess in which is disposed an O-ring 138 which seals between the nipple and the top internal flange 139 of the sleeve. The bottom nipple section is similarly provided with an external annular recess in which is disposed an O-ring 140 which seals between the nipple and the bottom internal flange 141 of the sleeve adjacent the lower end thereof. The sleeve has an external longitudinal recess 142 in whose upper end portion is rigidly secured, as by the screws 143, a port block 144 whose passage or port 145 opens to the lateral port 146 of the sleeve. The lateral port 146 communicates with the port 47b of the intermediate nipple section through the cylindrical space or passage 147 between the sleeve and the nipple and between the O-rings 138 and 140. The ports 146 and 47b are always in communication regardless of the position to which the sleeve is rotated on the nipple.

One end of a resilient tube or duct 150 extends into the enlarged outer portion 149 of the port of the port block 144 and is secured therein in any suitable manner, as by bounding. The outer end of the duct 150 extends into the enlarged outer portion 151 of the passage or port 152 of the port block 153 which is rigidly secured, as by the screws 154, to the intermediate outer portion of a bow spring 156. The outer end of the passage 152 opens to the port 157 of the bow spring. The upper end of the bow spring is received in an upper longitudinal recess 160 of the sleeve 130 and is secured thereto by screws 161 while its lower planar end portion is received in a lower longitudinal recess 162 of the sleeve and is held against outward displacement by a retainer plate 163 secured to the sleeve by the screws 165. The lower end of the bow spring is free, as the intermediate portion of the bow spring moves inwardly and outwardly, to move slidably in the recess 161 to accommodate such inward and outward movement of the intermediate portion of the bow spring.

As a string of tubing in which the flow control device 30c is connected is moved into a well, the outer portion of the bow spring engages the internal surface of the well bore since its inherent position is the outermost position illustrated in the drawing. The sleeve 130 is free to rotate on the nipple 31c to facilitate movement of the flow control device 30c through a well since the relatively large longitudinal surface of the intermediate portion of the bow spring which engages the internal surfaces of the well may tend to hinder or restrain any rotation of the nipple if the sleeve were rigidly secured to the nipple.

It will be apparent that when a string of tubing in which the flow control device 30c is connected is lowered into a well to a position wherein the flow control device is in alignment with a producing earth formation, the port 157 of the outer intermediate portion of the bow spring engages the internal surfaces of such producing earth formation so that when a charge of cement slurry is introduced into the well bore to close the well bore at the location of the earth formation, at most a very thin layer of cement will be disposed between the bow spring and the earth formation. After the cement sets, the sleeve valve 60c is moved upwardly to its upper position and subsequent swabbing of the string of tubing causes a pressure differential to be created across such thin layer of cement at the port 157 which causes it to disintegrate and thus establishes fluid communication between the string of tubing and the earth formation at the port 157.

The nipple 31c is not provided with any signal generating means, such as a pellet of radioactive substance, since the sleeve 130 is rotatable on the nipple. If desired, the sleeve 130 may be provided with several assemblies of a bow spring, port block and resilient duct assemblies spaced circumferentially about the sleeve.

Referring now to FIGURES 10 and 11 of the drawing, the flow control device 30d is also similar to the flow control device 30 and accordingly its elements have been provided with the same reference numerals, to which the subscript "d" has been added, as the corresponding elements of the flow control device 30 illustrated in FIGURES 3 and 4. The intermediate nipple section 33d of the nipple 31d has a pair of diametrically opposed lateral ports 47d. A duct means 90d is associated with each port 47d and includes a collapsible bellows 175 whose inner end is secured as by the screws 176 to the intermediate nipple section about a port 47d. The outer end of the collapsible bellows is secured in any suitable manner as by welding or the like to the intermediate outwardly displaced portion 178 of the bellows bow spring 179. The outer end of the bellows opens to the port 180 of the bellows bow springs. The lower end of each of the bellows bow springs is rigidly secured, as by the screws 182, to the bottom nipple section 34d while its upper end is rigidly secured, as by the screws 184, to a slide ring 185 slidably disposed on the top nipple section. Upward movement of the spring ring 185 is limited by the engagement of its top annular end shoulder or surface with the bottom shoulder of a stop ring 188 threaded on the top nipple section 32d. Downward movement of the slide ring is limited by the engagement of its bottom annular end shoulder or surface with the top annular surface of the external annular flange 189 of the top nipple section. Guide bow springs 190 and 191 are disposed on opposite sides of each of the bellows bow spring 179 and their lower ends are rigidly secured to the bottom nipple section by screws 192 and their upper ends to the slide ring by screws 193. An annular protective boss 194 is rigidly secured, as by welding to the intermediate nipple section about each port 47d of the intermediate nipple section 33d.

In use, the flow control device 30d is connected in a string of tubing in the same manner as the flow control device 30. As the string of tubing is lowered into a well, the bow springs engage the internal surfaces defining the well since the distance between the outer intermediate portions the bow springs is inherently somewhat greater than the internal diameter of the well bore. As the intermediate portions of the bow springs move inwardly during the movement through the bore, the slide ring moves upwardly on the top nipple section 32d to accommodate such movement.

The bellows 175 also contract and expand as required during the inward and outward movement of the bellows bow springs. When the string of tubing has been moved to the position wherein the flow control device is at a desired location at a producing earth formation, the outer intermediate portions 178 of the bellows bow springs 179 contact the internal surfaces of such earth formation. A charge of cement slurry is then introduced into the well bore to close the well bore between the earth formation and the flow control device and also to seal the surfaces of the earth formation. Since the intermediate portions 178 of the bellows bow springs now engage the surfaces of the earth formation, only relative very thing layers of cement are interposed between the bow springs and the earth formation at the ports 180 of the bow springs. When the cement sets and hardens, the sleeve valve 60d is raised to its open position and as the string of tubing is then swabbed, the pressure differential thus created disintegrates such thin lyaers of cement and fluid communication is thus established between the producing earth formation and the longitudinal flow passage of the string of tubing.

In the event that two strings of tubing, 101d and 102d, each provided with one or more of the flow control devices 30d are to be installed in a well, the first string of tubing through which the well fluids from the lowermost earth formation are to be produced is lowered first into the well and then the next string of tubing is lowered thereinto, the guide springs of the flow control devices of the second string of tubing straddling the first string of tubing as illustrated in FIGURE 11. As the bottom end of such second string of tubing moves downwardly, it may engage one of the bellows bow springs of the flow control device connected to the first string of tubing 101d and may cause it to deflect downwardly and may even move it out of engagement with the earth formation. However, at least one of the bellows bow springs of such flow control device will always be in position in engagement with or adjacent the producing formation and fluid communications as will be established through at least one of the duct means 90d.

Referring now particularly to FIGURES 12 through 16 of the drawings, the flow control device 30e is similar to the flow control device 30 illustrated in FIGURES 3 and 4 and, accordingly, its elements have been provided with the same reference numerals, to which the subscript "e" has been added as the corresponding elements of the flow control device 30. The lateral duct means 90e includes a longitudinally extending guide 200 whose inner middle portion 201 is positioned in an external recess 202 of a boss welded to the intermediate nipple section 33e. The guide 200 has top and bottom end portions 205 and 206 which are connected by narrow neck portions 207 and 208 to the intermediate portion. The neck portions 207 and 208 extend through the longitudinal slots 209 and 210, respectively, of the boss which opens to its recess 202. The middle portion 201 of the guide has inner longitudinal recesses 211 and 212 above and below the telescopable duct 213 whose intermost section 214a has an outer end portion which extends through a lateral aperture 215 of the middle portion of the guide and is rigidly secured to the guide, as by welding. The middle portion of the guide also has top and bottom slots 216 and 217 which open upwardly and downwardly, respectively, to the recesses 211 and 212 in which are receivable the flat free end portions 219 and 220, respectively, of the top and bottom springs 224 and 225. The bottom free end portion 219 of the top spring is wider than the slot 216 and its lateral portions are received, when the guide is in the retracted position illustrated in FIGURES 12, 13 and 14, in the longitudinally extending opposed slots 226 and 227 of the boss which open into the slot 216 and the recess 211. The top spring has an intermediate portion 228 which extends upwardly and inwardly and a flat vertical portion 229 which extends upwardly through a longitudinal inner recess 231 of the guide. The top end portion of the top spring is rigidly secured to a piston cylinder 234 disposed about the top nipple section 32e.

The bottom spring 235 is identical to the top spring. The lateral portions of the free end portion 220 of the top spring are received in the opposed longitudinal slots 237 and 238 of the boss which open to its slot 210, its intermediate downwardly and inwardly inclined portion 240 is disposed in the inner recess 212 and its lower end portion 241 extends downwardly through an inner slot 242 of the guide. The bottom end portion of the bottom spring is rigidly secured to a bottom piston flange 245 provided with an internal annular recess in which is disposed an O-ring 246 which seals between the piston flange and the external surface of the top nipple section above the lateral port 248 thereof. The top nipple section has an internal annular recess in which is disposed an O-ring 249 which seals between the top nipple section and the piston cylinder below the port 248 and the external upwardly facing annular shoulder 250 formed by an enlargement of the top nipple section.

It will be apparent that when fluid under pressure is introduced through the port 248 into the chamber between the top nipple section and the piston cylinder between the shoulder 250 of the top nipple section and the downwardly facing annular shoulder 253 of the top piston cylinder, the piston cylinder will be moved upwardly on the nipple until its top annular shoulder 255 engages the downwardly facing shoulder 256 of the stop ring 257 rigidly secured to the top nipple section. As the top piston cylinder moves upwardly, the lower free end 219 of the top spring is moved from the opposed slots 226 and 227 of the boss and the slot 219 of the guide and is thus freed for movement to its inherent position where it is remote from the nipple. The top spring therefore exerts an outward force on the inner surface of the guide tending to move the guide outwardly.

The bottom piston cylinder 245 has an internal piston flange 260 provided with a recess in which is disposed an O-ring 261 which seals between the bottom nipple section 34e and the piston flange above a lateral port 263 of the bottom nipple section. The bottom nipple section has an external annual recess in which is disposed an O-ring 264 which seals between the bottom nipple section and the piston cylinder above the port 263 and a downwardly facing annular shoulder 266 provided by an enlargement of the bottom nipple section. When fluid under pressure is introduced through the port 263 into the annular space between the bottom nipple section and the piston cylinder and between the annular shoulder 266 of the bottom nipple section and the top annular shoulder 268 of the piston flange, the piston cylinder is moved downwardly until its bottom annular end or shoulder 270 engages the top annular stop shoulder 271 of the stop ring 272 rigidly secured to the bottom nipple section.

When the bottom piston cylinder moves downwardly, the free end 220 of the bottom spring 225 is moved out of the opposed slots 237 and 238 of the boss 203 and the slot 219 of the guide. The free end of the spring then exerts an outward force on the guide.

Fluid pressure is communicated through the port 263 to the chamber between the piston cylinder and the bottom nipple section to the flow ports 265e of the sleeve valve 60e when the sleeve valve 60e is in its lowermost position in the nipple since no sealing means is provided between the nipple and the sleeve valve above the port 263 and below the flow ports 65e of the sleeve valve.

The outermost section 214d of the telescopable duct 213 is rigidly secured as by welding to the intermediate nipple section. An intermediate duct section 214b has an internal annular flange 280 at its outer end which is engageable by an external annular flange 281 at the inner end of the duct section 214a. Similarly, the external annular flange 283 at the inner end of the duct section 214b is engageable with the internal annular flange 284 at the outer end of the duct section 214, and the external annular flange 285 at the inner end of the duct section 214c is engagebale by the internal annular flange 286 at the inner end of the duct section 214d.

It will thus be apparent that as the guide 200 is moved outwardly from its innermost position illustrated in FIGURES 12 through 16, it moves the innermost section 214a outwardly therewith and, as the coengageable flanges of the duct sections 214a, 214b and 214c are successively moved into engagement with one another, the outward movement of the body causes the duct sections 214b and 214c to be moved outwardly until the outward movement of the duct section is stopped when the flange 285 of the duct section 214c engages the flange 286 of the outermost duct section 214d.

In use, the flow control device 30e is connected in a string of tubing with its duct means 90e in the retracted position illustrated in FIGURES 12 through 16, wherein the free end portions 219 and 220 of the springs 224 and 225 are disposed in the slots 216 and 217 of the guide and in the opposed slots of the boss and the springs and the guide are held, by the engagement of the free end portions of the springs in the opposed slots of the boss, in their retracted positions. When the string of tubing has been moved to a position wherein the flow control device 30e is at its desired location relative to a producing earth formation, the string of tubing may be oriented in the manner previously described in connection with the flow control device 30 by means of the pellet of radioactive substance 97e disposed in the bore 96e of the top nipple section 32e.

During the installation of the string of tubing in the well, the pressure within the string of tubing and the flow control device is equal to that at the exterior thereof and the piston cylinders remain in the positions illustrated in FIGURES 12 through 14. The pressure within the string of tubing is then increased as by closing the tubing below the flow control device 30e in any suitable manner, as by means of a plug, check valve or other suitable device and pumping fluid thereto at the surface as the pressure within the string of tubing is increased, the piston cylinders are moved in opposite directions. The free ends of the springs 224 and 225 are moved out of the slots 216 and 217 of the guide and the opposed slots of the boss at opposite sides of the slots 207 and 208 and the resilient force of the springs moves the guide outwardly until the guide engages the internal surfaces of the earth formation at the well bore or the telescopable duct 213 is moved to its fully extended position.

The sleeve valve 60e is then moved to its closed position and a charge of cement slurry is introduced into the well bore to close the well bore between the earth formation and the string of tubing. When the cement sets and hardens, the sleeve valve 60e is moved to its open position and the tubing is swabbed. The pressure differential thus created causes any thin layer of cement between the guide and the earth formation to disintegrate and fluid communication is established through the duct means 90e between the earth formation and the interior of the string of tubing.

Referring now to FIGURES 18 and 19 of the drawing, the flow control device 30f is similar to the flow control device 30 and, accordingly, its elements have been provided with the same reference numerals, to which the subscript "f" has been added, as the corresponding elements of the flow control device 30. The duct means 90f of the control device 30f includes a cylinder 300 rigidly secured to the intermediate nipple section 33f which extends about the lateral port or aperture 47f of the intermediate nipple section. The telescopable duct 301 includes an outer section 302a threaded in the cylinder 300 and provided with an external annular flange 303 having an annular recess in which is disposed an O-ring 304 which seals between the telescoping duct and the outer annular end surface 305 of the cylinder.

The outer duct section 302a has an internal annular recess in which is disposed an O-ring 308 which seals between the outer duct section and a middle duct section 302b. The middle duct section at its inner end has an external annular recess in which is disposed a resilient split ring 310 which is engageable with the internal teeth 312 of the outer duct section. The teeth are inclined outwardly so that the split ring is cammed thereby inwardly as the middle duct section is moved outwardly to permit such outward movement of the middle duct section. The split ring wedges against any tooth 312 past which it has moved outwardly to prevent inward movement of the middle section.

The middle duct section has an external annular recess at its outer end in which is disposed a split ring 314 which is engageable with the outer annular end shoulder or surface 315 of the outer duct section 302a to limit inward movement of the middle duct section relative to the outer duct section.

The inner duct section 302c similarly has an external annular recess in which is received a split ring 317 which is engageable with the internal teeth 318 of the middle duct section. The split ring is cammed inwardly as the inner duct section 302c is moved outwardly since the teeth are inclined outwardly but is wedged against the outer faces of the teeth to prevent inward movement of the inner section relative to the middle duct section. The inner duct section is also provided adjacent its outer end with an external annular recess in which is disposed a split ring 319 which limits inward movement of the inner duct section in the middle duct section by engaging its end shoulder or surface 320. The middle duct section is provided with an internal annular recess in which is disposed an O-ring 321 which seals between the inner duct section and the middle section.

The three duct sections 302a, 302b and 302c are provided at their inner ends with internal seats 321, 322 and 323 of different dimensions on which are seatable different sized balls 325, 326 and 327 as illustrated in FIGURE 16.

A pair of guides 325 and 326 are secured to the middle nipple section above and below the duct means 90f to protect the duct means against damage during the movement of the flow control device through a string of tubing. The flow control sleeve 60f has a single flow port 65f which is of somewhat greater diameter than the seat 321 of the outer duct section. The sleeve valve is held against rotation in order that the flow port 65f be in alignment with the port 47f and the seat 321 by means of a laterally outwardly extending pin 328 slidably disposed in a longitudinal slot 329 of the bottom nipple section 34f.

In use, when the flow control device 30f, connected in a string of tubing, is positioned at a desired location in the well, the sleeve valve 60f is moved upwardly to its open position and a ball, such as the ball 327, is pumped downwardly through the string of tubing and is moved, by the fluid which is flowing outwardly through the inner duct section 302c, through the flow port 65f and into engagement with the seat 323. This creates a pressure differential across the innermost duct section 302c which is moved outwardly in the middle section. The split ring 317 is cammed inwardly by the inner surfaces of the teeth 318 as the inner duct section moves outwardly until the split ring 317 engages the internal annular shoulder 335 of the middle duct section. Continued outward movement of the inner duct section then causes the movement of the middle duct section until its split ring 310 engages the internal annular shoulder 336 of the outer duct section. The telescopable duct 301 is then in its fully extended position unless prior to its movement to its fully extended position, the sharp knife edge 337 of the inner duct section engages the producing earth formation and digs thereinto.

The sleeve 60f is then moved to its closed position, a charge of cement slurry is introduced into the well to close the well bore between the string of tubing and the earth formation and to seal off the earth formation. After the cement has set and hardened, the sleeve valve 60f is again raised to its upper open position and the string of tubing is swabbed of the weighted mud or liquid which creates a pressure differential across any thin layer of cement which may extend across the outer end of the inner duct section at its position of contact with the earth formation to establish fluid communication between the string of tubing and the earth formation.

It will be apparent that the nipple 31f may be provided with a signal generating means, such as a pellet of radioactive substance, in the same manner as the nipple 31 of the flow control device 30 and for the same purpose.

Referring now to FIGURES 20 and 21 of the drawing, the flow control device 30g is similar to the flow control device 30 and, accordingly, its elements have been provided with the same reference numerals, to which the subscript "g" has been added, as the corresponding elements of the flow control device 30. The duct means 90g of the flow control device 30g includes a sleeve 350 disposed about the intermediate nipple section 33g and provided with a plurality of lateral apertures 351 which open into an annular recess 352 thereof and which are aligned with the lateral ports 47g of the intermediate nipple section 33g. The sleeve 350 is secured in position by means of one or more dowel pins 354 which extend through suitable apertures in the sleeve into aligned bores or recesses 355 of the intermediate nipple section 33g. A resilient duct 357 extends outwardly through each of the apertures 351 of the sleeve 350 and is provided with an external annular flange 358 at its inner end disposed in the recess 352 which prevents outward displacement of the duct. The outer end of each duct 357 is closed by a relatively thin end wall 359. The ducts 357 are made of a resilient tough plastic substance such as polyurethane. The internal diameter of the sleeve 350 is somewhat larger than the external diameter of the intermediate nipple section to provide an annular passage or channel 361 therebetween.

In use, the passages or bores 363 of the ducts 357 are filled with a viscous substance such as water pump grease or the like at the time of the connection of the flow control device 30g in a string of tubing. The string of tubing is then lowered in the well and if any of the ducts engage any internal obstructions and are bent in passing such obstruction, such bending is permitted by the extrusion of the water pump grease through the passage 361 between the sleeve 350 and the intermediate nipple section. As any such bent duct 357 resiliently moves back to its radially outwardly extending position after passing such obstruction, the fluid in the well may flow back into the duct through the passage 361 to permit such return of the ducts to their original positions.

When the string of tubing is positioned in the desired location in the well with the flow control device in alignment with a producing earth formation, at least some of the ducts will have their outer ends position in engagement with or positioned very closely to the producing earth formation. A charge of cement slurry is then introduced into the well to fill the well bore between the string of tubing and the producing earth formation and after the cement has set and hardened, the sleeve valve 60g is moved to its upper open position, and the string of tubing is swabbed to create a pressure differential between the producing earth formation and the interior of the string of tubing which causes the end walls 359 of the ducts and any thin layer of cement between the earth formation and the end walls to disintegrate and rupture and thus establish fluid communication between the interior of the string of tubing and the producing earth formation.

It will be apparent that, if desired, the sleeve 30g may be provided with only one aperture 351 and one duct 357 in which event the nipple 31g is provided with a signal generating means such as radioactive pellet in order to properly control its positioning in a well.

It will now be seen that in each of the various forms of the flow control device 30 illustrated and described includes a nipple having at least one lateral port, a valve, such as a sleeve valve 60 for closing the lateral port of the nipple, and a duct means 90 which in operative position extends radially outwardly of the nipple into contacting or engagement with or position adjacent the internal surface of a producing earth formation in a well in order that a charge of cement slurry may be introduced into the well bore about the producing earth formation and the string of tubing in which such flow control device is connected, the duct means providing a passage which communicates with the lateral port of the nipple.

It will be further seen that the lateral passages provided for the duct means 90 of the several different forms of the flow control device embodying the invention may be filled with a suitable substance, such as water pump grease, which is movable therefrom by fluid pressure, prior to the movement of the flow control devices into a well to prevent filling of the passages with the liquid present in the well.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A flow control device including: a nipple having a longitudinal passage and a lateral port communicating the exterior of the nipple with the longitudinal passage intermediate its ends; fully extended duct means on said nipple extending laterally outwardly beyond the outer periphery of said nipple and providing a lateral passage communicating at its inner end with said lateral port, the outer end of said lateral passage being spaced radially outwardly beyond the outer periphery of said nipple; and valve means carried by said nipple and operable by means movable in said longitudinal passage for selectively opening and closing said lateral port.

2. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple, said duct means comprising flexible resilient tubular duct section means secured at its inner end to said nipple and projecting laterally a distance from the exterior of said nipple, said tubular duct section open at its outer end; and valve means carried by said nipple and operable by means movable in said longitudinal passage for selectively opening and closing said lateral port.

3. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple; said duct means comprising a cylinder section rigid with said nipple and extending radially outwardly therefrom and a flexible resilient tubular duct section secured at one end in said cylinder section and having a passage therethrough, said duct section having closure means closing said passage of said duct section at its outer end, said closure means being frangible whereby said passage of said duct section may be opened for fluid flow when said closure is broken by a pressure differential exerted thereacross; and valve means carried by said nipple and operable by means movable in said longitudinal passage for selectively opening and closing said lateral port.

4. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple, said duct means comprising a cylinder section rigid with said nipple and an inner flexible resilient tubular section having a resilient end portion projecting outwardly of said cylinder section; and valve means carried by said nipple and operable by means movable in said longitudinal passage for selectively opening and closing said lateral port.

5. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple, said duct means comprising a cylinder section rigid with said nipple and a flexible resilient tubular section secured at one end to said cylinder section and having an outer portion extending outwardly beyond said cylinder section and spaced from and projecting outwardly of said nipple beyond said cylinder section, said outer end of said resilient tubular section being open; and valve means carried by said nipple and movable longitudinally in said longitudinal passage of said nipple for selectively opening and closing said lateral port of said nipple to control communication between said tubular section of said duct means and the longitudinal passage of the nipple.

6. A flow control device including: a nipple having a longitudinal passage and a lateral port communicating the exterior of the nipple with the longitudinal passage intermediate its ends; normally fully extended flexible resilient tubular duct means on said nipple extending laterally outwardly of said nipple and providing a lateral passage communicating at its inner end with said lateral port, the outer end of said lateral passage being spaced radially outwardly of said nipple; and valve means carried by said nipple and operable by means movable in said longitudinal passage of said nipple for selectively opening and closing said lateral port and said lateral passage of said duct means.

7. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple, said duct means including a tubular flexible resilient duct having one end connected to said nipple, and a spring secured to said nipple and having an outer portion spaced outwardly of said nipple and provided with a port, said outer portion being movable resiliently with respect to said nipple, said resilient duct having its outer end secured to said outer portion and in communication with said port of said spring; and valve means carried by said nipple and operable by means movable in said longitudinal passage for selectively opening and closing said lateral port.

8. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple, said duct means comprising a sleeve disposed about said nipple and having an aperture and a resilient tubular duct extending radially outwardly of said sleeve through said aperture, said tubular duct having a passage whose inner end communicates with said port of said nipple; and valve means carried by said nipple and operable by means movable in said longitudinal passage for selectively opening and closing said lateral port.

9. A flow control device including: a nipple having a longitudinal passage and a lateral port communicating the exterior of the nipple with the longitudinal passage intermediate its ends; duct means on said nipple extending laterally outwardly of said nipple and providing a lateral passage communicating at its inner end with said lateral port, the outer end of said lateral passage being spaced radially outwardly of said nipple, said duct means comprising a sleeve disposed about said nipple and having an aperture and a flexible resilient tubular duct extending radially outwardly of said sleeve through said aperture, said tubular duct having a passage whose inner end communicates with said port of said nipple, said sleeve and said nipple providing a passage communicating the inner end of said passage of said tubular duct with the exterior of the nipple at a location spaced longitudinally from said inner end and said port of said nipple; and valve means carried by said nipple and operable by means movable in said longitudinal passage for selectively opening and closing said lateral port.

10. A flow control device of the character set forth in claim 1 and including: signal generating means carried by said nipple in predetermined relation relative to said duct means providing a radiation signal for indicating the orientation of said duct means relative to the longitudinal axis of said nipple.

(References on following page)

References Cited

UNITED STATES PATENTS

| | | | |
|---|---|---|---|
| 2,441,894 | 4/1948 | Mennecier | 166—100 |
| 2,707,997 | 4/1955 | Zandmer et al. | 166—100 |
| 2,708,000 | 4/1955 | Zandmer | 166—100 |
| 2,855,049 | 10/1958 | Zandmer | 166—100 |
| 2,886,109 | 4/1959 | Yancey et al. | 166—100 |
| 3,051,243 | 8/1962 | Grimmer et al. | 166—224 |
| 3,104,712 | 9/1963 | Whitten | 166—100 |
| 3,120,268 | 2/1964 | Caldwell | 166—100 |
| 3,145,771 | 8/1964 | Pennebaker | 166—35 |
| 3,194,312 | 7/1965 | Thomas | 166—100 |
| 3,196,949 | 7/1965 | Thomas | 166—100 |
| 3,245,472 | 4/1966 | Zandmer | 166—100 |

OTHER REFERENCES

The Permeator, Oil and Gas Journal, Oct. 26, 1959, vol. 57, No. 44, pp. 100–105.

JAMES A. LEPPINK, *Primary Examiner.*